A. F. ERICKSON.
BOTTLE HOLDING DEVICE.
APPLICATION FILED SEPT. 21, 1916.
1,222,086.
Patented Apr. 10, 1917.
2 SHEETS—SHEET 1.
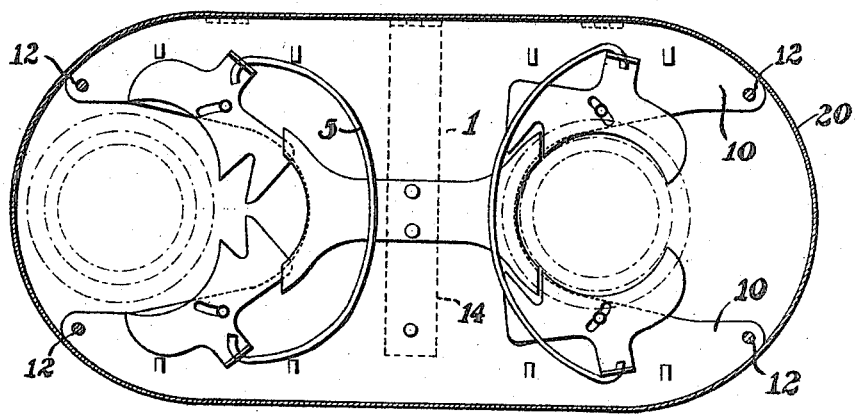
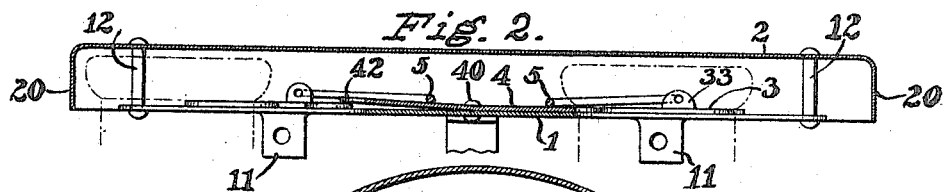
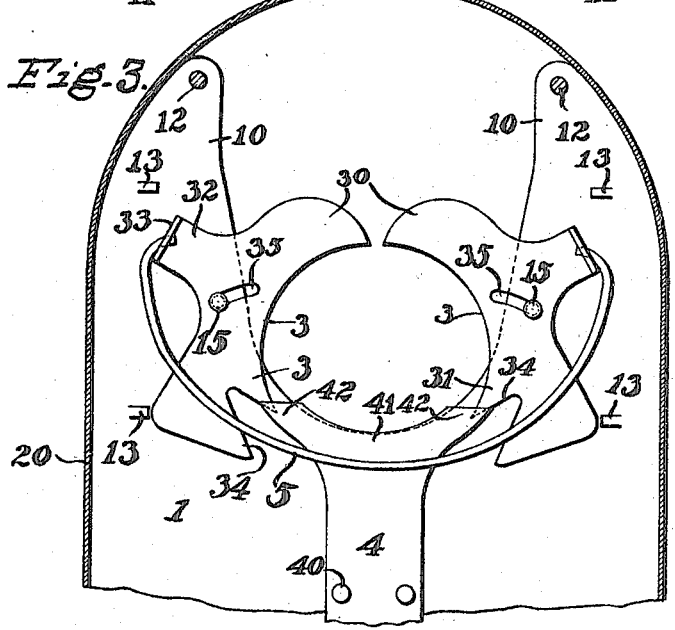
Inventor.
Arthur F. Erickson
By Henry L. Reynolds.
Attorney, A. F. ERICKSON.
BOTTLE HOLDING DEVICE.
APPLICATION FILED SEPT. 21, 1916.
1,222,086.
Patented Apr. 10, 1917.
2 SHEETS—SHEET 2.
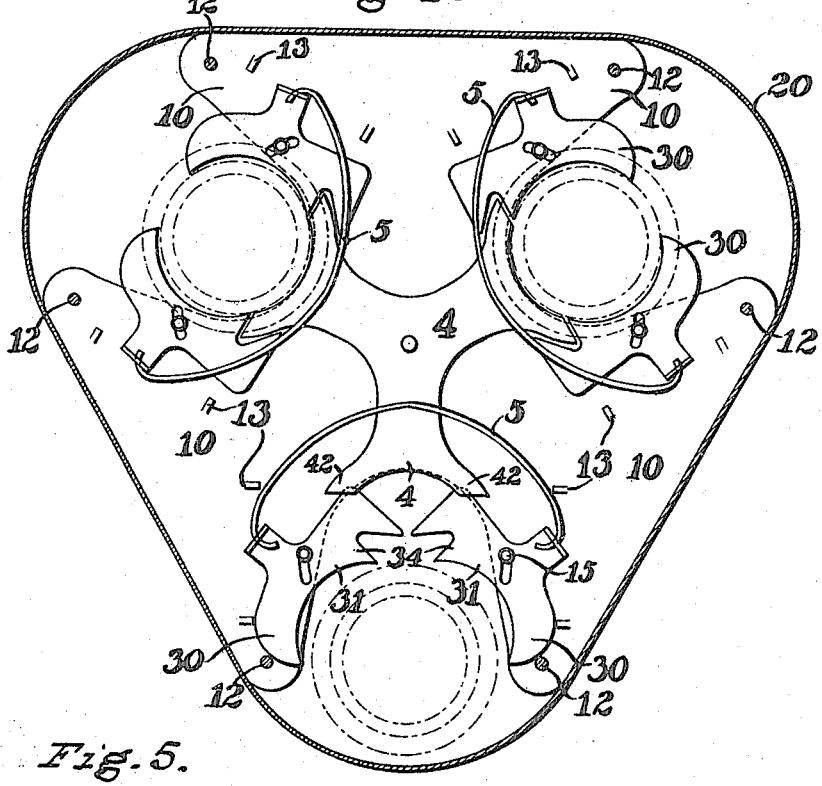
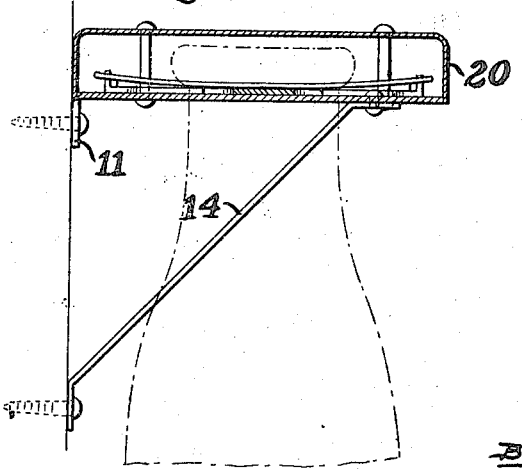
Inventor.
Arthur F. Erickson
By Henry L. Reynolds
Attorney.

UNITED STATES PATENT OFFICE.

ARTHUR F. ERICKSON, OF SEATTLE, WASHINGTON.

BOTTLE-HOLDING DEVICE.

1,222,086.  Specification of Letters Patent.  Patented Apr. 10, 1917.

Application filed September 21, 1916. Serial No. 121,389.

*To all whom it may concern:*

Be it known that I, ARTHUR F. ERICKSON, a citizen of the United States, and resident of the city of Seattle, county of King, State of Washington, have invented certain new and useful Improvements in a Bottle-Holding Device, of which the following is a specification.

My invention relates to devices designed to hold a bottle and to release it under certain conditions and is particularly designed for use in holding milk bottles.

The object of my invention is to produce a device which will safely hold milk bottles and which will prevent the removal of a bottle unless another is replaced therein.

The object is thus, first, to prevent unwarranted removal of the bottle, and second, to insure the return of an empty milk bottle when a full one has been removed.

My invention comprises the novel features and constructions which will be hereinafter described and particularly pointed out in the claims.

In the accompanying drawings I have shown my invention embodied in the forms and construction which are now most preferred by me.

Figure 1 is a horizontal section taken through the casing above the working parts.

Fig. 2 is a longitudinal vertical section taken on the center line.

Fig. 3 is a horizontal section taken above the working part showing one of the bottle holding means.

Fig. 4 is a horizontal section taken above the working part, showing a holder provided with three bottle holding devices.

Fig. 5 is a transverse vertical section of the device in the two compartment type shown in Fig. 1, this section being taken a little to one side of the center.

In the delivery of milk in bottle form, it is desirable, on the part of the consumer, to insure that his milk is not removed by another and it is also desirable, on the part of the seller, to insure the return of an empty milk bottle for each full bottle delivered, as well as to insure that the party intended shall receive the milk delivered. I have devised the present device which contributes materially toward securing these results.

In the device as shown in all of the figures of drawings, except Fig. 4, I have shown a two compartment holder, while Fig. 4 shows a three compartment holder constructed along analogous lines. The working parts of my invention are mounted within a casing which has but shallow vertical depth. As herein shown, this consists of a bottom plate 1 and a top cover 2, one of these being provided with a marginal flange which serves to hold the plates apart and to provide sufficient room for the engaged bottle mouths. These two plates are herein shown as secured together by rivets 12.

As herein constructed, the flange 20, which spaces the two plates apart, is made as an integral part of the upper plate 2. This is, however, a minor feature of construction and may be varied as desired or found suitable.

The bottom plate 1 is provided with an opening, or notch, in each end, of sufficient size to receive the mouth end of a bottle. Milk bottles of the standard construction are provided with a ring extending about their mouth which is of larger diameter than the neck, from which it follows that the bottles may be suspended by this enlarged ring, if inserted in a yoke or slot of proper size.

The formation of the bottle receiving notch in each end leaves two arms 10. The inner end of this notch is made of a size and shape to closely engage the neck of a bottle below the ring or rib which surrounds its mouth. Upon each of the arms 10 is pivoted a bottle holding lever 3, which lever has its inner surfaces curved to fit with more or less closeness the curvature of the bottle neck. These bottle holding levers are mounted upon pivot pins 15, such mounting being preferably by a slot 35 which permits a certain amount of bodily movement of the lever, as well as the pivot action. This permits the levers to accommodate themselves to hold bottles of considerable variation in diameter of neck.

Each lever 3 has an arm 32 extending outwardly, or away from the bottle holding side of said lever. These arms are engaged by a spring which exerts a constant pressure inwardly, or toward the bottle holding position, of such force as will rock the levers upon their pivots and force them inwardly as far as their connections will permit. The location of the points of attachment of the spring with these levers is such that, in swinging between the open and closed positions, these points of attachment will swing to opposite sides of a dead center, whereby the spring acts to hold the levers in both of these positions when the levers have been placed therein.

The inner end of each lever is provided with a notch 34, which is adapted to receive an arm 42 upon the end of a locking lever or bar 4. This locking lever 4 is mounted upon the lower plate 1, as by rivets 40, which are, however, a sufficiently loose fit to permit a slight vertical movement of the ends of said bar. The bar 4 is also so mounted, or constructed, that one end thereof will be raised above the plate 1 when the other is held down. This elevation of one end of the plate is sufficient to raise it above the plane of the levers.

In the locked position of the levers 3, as is shown at the right hand end of Fig. 1, the arms or tips 42 of the bar 4, lie in the notches 34 of levers 3 and this end of the bar 4 is held down by engagement with the projecting ring at the mouth of the bottle which is held therein. In this position of the levers 3, their outer ends 30 embrace the bottle sufficiently to prevent its being pulled outwardly without swinging these ends of the levers. This swinging of the levers can not occur, however, by reason of engagement of the notches 34 with the ends 42 of bar 4. Consequently, the bottle can not be removed unless in some way the engaging end of bar 4 is raised.

At the left hand end of Fig. 1 the parts are shown in open position, ready for the insertion of a bottle. The outline of a bottle end is shown in dot-and-dash lines at this end of Fig. 1, and also in Fig. 2. By inserting a bottle top in this position and then moving it inwardly or toward the center of the device, the bottle neck engages the parts 31 of levers 3 and pushes the inner ends of these levers inwardly and their outer ends are swung toward each other and embrace the bottle neck. The bottle is pushed inwardly until its neck engages the end of the lever or locking bar 4, when it is released and its weight is then supported by engagement with the edges of the two levers 3 and the end 41 of the locking bar 4.

The weight of the bottle acting upon the bar 4 tends to raise the opposite end. The bar 4 may be made of such weight and material that it will bend under the weight of the two bottles, sufficiently to draw down the end which had been previously raised, without raising the opposite end, thus locking both pairs of levers 3. Whether this is done or not, the opposite end of the lever 4 will be raised whenever the bottle which is being held thereby is lifted sufficiently to remove its weight from the locking bar 4. When this is done, the levers 3 at this end of the device are freed and the bottle may be removed.

In the position of the levers 3 and bar 4, as shown in Fig. 3, the fact is illustrated that, when one end of the locking bar 4 is raised the spring, which consists of a semicircular piece of round wire having its ends entering holes in lugs 33 which are turned upwardly along the outer ends of arms 32, will cause inward movement of the levers such as to throw the tips 31 under the tips 42 of bar 4, to thereby prevent downward depression of this end of the bar and, therefore, prevent the elevation of the opposite end by engagement of the lever at the end which does not contain a bottle.

In the position of the levers 3, which is shown at the left hand end in Fig. 1, the same being the position normally occupied when a bottle has been removed from its compartment, the outer corners of the inner ends of levers 3 are shown as extending under the tips 42 of the locking bar 4, thereby preventing release of the bottle held in the other compartment by engaging the opposite end of the bar 4.

The swinging movement of the levers 3 is limited, in both directions, by stops carried by the plate 1, upon which they are mounted. Such stops may conveniently consist of lugs 13 which are stamped upwardly from the body of the plate. The device may be conveniently mounted by means of two lugs or ears 11, which are made as integral parts of the lower plate 1 and are provided, each with a hole for the insertion of a securing screw. To additionally support the device, a brace 14 may be employed, which is secured by one end to the lower plate 1 at a distance removed from the side which contains the ears 11. The device may thus be mounted upon any wall surface.

In the device as shown in Fig. 4 the same principles are employed, but in such form as to provide three bottle holding compartments instead of two. In this type of construction it is necessary that two bottles be in the device in order to secure the release of the third.

By the use of this device the bottles are securely held and may not conveniently be removed except by placing an empty bottle in one of the compartments. The device, as shown in Fig. 4, may be used for holding three filled bottles, in which event, one of these bottles may be removed, the particular one being removed being immaterial.

The device, as shown in Fig. 1, may be used for holding two filled bottles, in which event, one of the bottles may be removed; the second one, however, can not be removed without the insertion of another bottle.

The use of this device will contribute materially to secure a prompt return to the milkman of the empty bottles, as the consumer will find it difficult to get the filled bottle unless an empty bottle is returned. It is thus of great advantage to the milk dealer and it is also of advantage and a convenience to the consumer as it tends to prevent unauthorized removal of the bottle.

It requires no expending of extra time, either on the part of the milkman or of the consumer, to use this device. The manner of placing or removal of a bottle is a thoroughly natural one and consumes no extra time. While it is not claimed that this absolutely prevents unauthorized removal of a bottle, it is believed that it will have an effect of this kind. It is believed that it will contribute very materially toward the return of the empty bottles. It also provides a sanitary and convenient place for depositing the bottles.

What I claim as my invention:

1. A bottle holder having a plurality of bottle holding and locking devices and a common controlling member for all said devices having supporting engagement with all the bottles, and adapted to be acted upon by the weight of one bottle to release another.

2. A bottle holder having a plurality of bottle holding and locking devices and a locking member connecting all said devices and mounted to have a limited vertical movement, said locking member having supporting engagement with all the bottles, and adapted to be depressed by the weight of one bottle to lock said bottle and to release another bottle.

3. A bottle holder having a plurality of bottle holding and locking devices and a controlling member for all said devices having a central support permitting a slight rocking, said controlling member having supporting engagement with all the bottles and being adapted to rock under the weight of the other bottles to release a bottle when the weight of this bottle is removed.

4. A bottle holder provided with a plurality of means for receiving and holding bottles, each of said means including pivoted levers adapted to embrace a bottle neck, a locking plate centrally supported to have a limited vertical movement and having an arm for each bottle holding means adapted, when down, to lock the pivoted levers which hold said bottle, the arms of said locking plate being positioned to be depressed into locking position by a bottle.

5. A bottle holder provided with a plurality of means for supporting and holding a bottle by its neck, each of said means comprising two levers centrally pivoted and adapted to embrace the bottle neck, and a locking member centrally supported to have a limited vertical rocking movement and having an arm adapted to be interposed between said pivoted locking levers to prevent their release of the bottle, said arms being positioned to be depressed by the weight of the bottles.

6. A bottle holder comprising a casing having a plurality of openings in its bottom each adapted to receive the neck of a bottle, two levers pivoted upon the bottom of said casing to swing into bottle retaining and into bottle releasing positions, and locking means for said levers comprising a lever mounted to have a limited vertical movement to place its ends between said bottle holding levers and to rise to free said bottle holding levers, said locking lever being engaged and depressed by an inserted bottle to raise the other end into releasing position.

7. A bottle holder having a plurality of means each comprising two pivoted arms adapted to embrace a bottle neck to hold it, a locking member having an end adapted to enter between the ends of said pivoted levers to prevent their opening, and means actuated by the insertion of a bottle in one of the holders to release a bottle in another holder.

8. A bottle holder having a plurality of bottle holding means, each comprising two pivoted levers adapted to swing to embrace and retain a bottle neck, and means for locking said levers in holding position releasably controlled by the presence of a bottle in another holding means.

9. A bottle holder having a plurality of bottle holding means, each comprising two pivoted levers adapted to swing to embrace and retain a bottle neck, a spring acting upon said levers to hold them in either open or closed position.

10. A bottle holder having a plurality of bottle holding means, each comprising two pivoted levers adapted to swing to embrace and retain a bottle neck, a spring acting upon said levers to hold them in either open or closed position, and a pivoted locking member mounted to have a slight vertical rocking movement and having an end positioned to engage and be depressed by each of the bottles and entering between said bottle retaining levers to prevent their opening when said end is depressed.

Signed at Seattle, Washington, this 16th day of September, 1916.

ARTHUR F. ERICKSON.